No. 841,461. PATENTED JAN. 15, 1907.
B. F. SHUART.
HAND CULTIVATOR.
APPLICATION FILED JAN. 9, 1905.
2 SHEETS—SHEET 1.
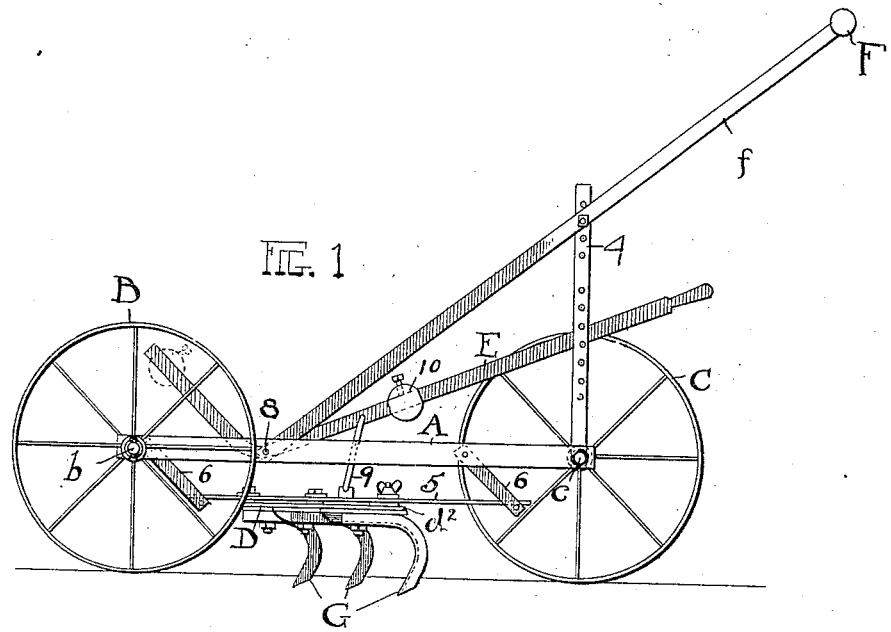
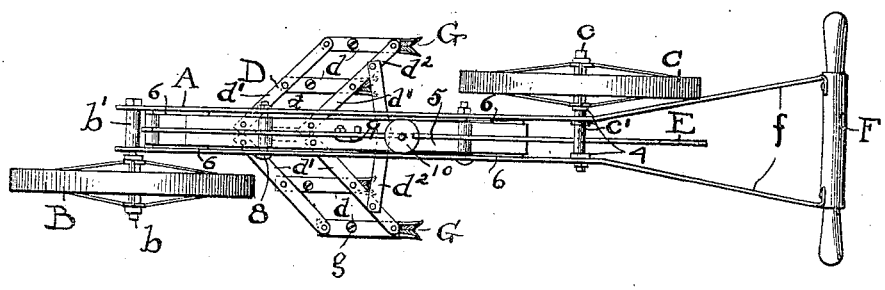
ATTEST.
INVENTOR
Benjamin F. Shuart
By H. J. Fisher Atty.

No. 841,461. PATENTED JAN. 15, 1907.
B. F. SHUART.
HAND CULTIVATOR.
APPLICATION FILED JAN. 9, 1905.
2 SHEETS—SHEET 2.
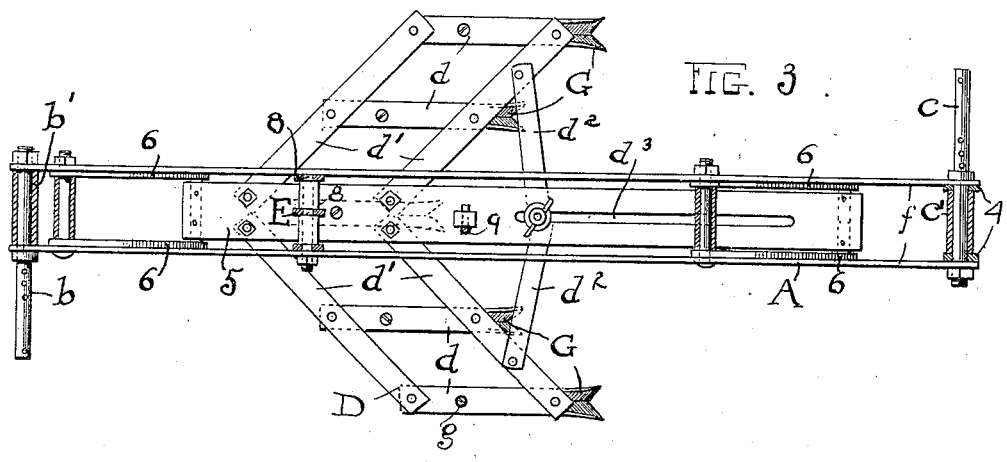
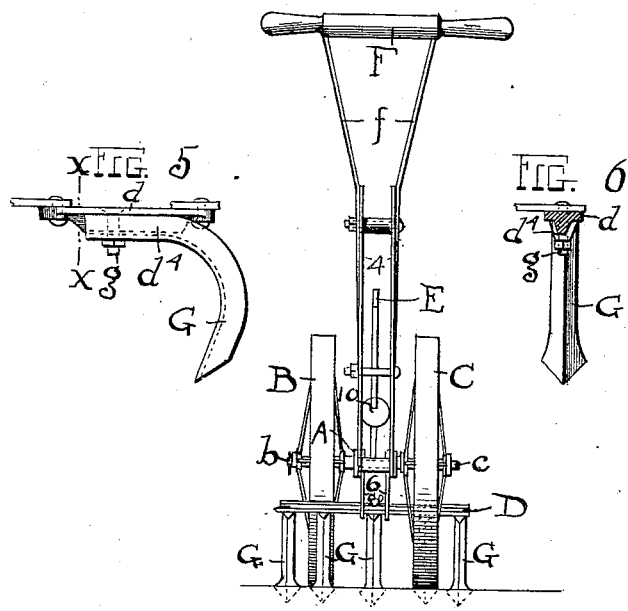
ATTEST.
INVENTOR
Benjamin F. Shuart
BY H. S. Fisher ATTY.

UNITED STATES PATENT OFFICE.

BENJAMIN F. SHUART, OF OBERLIN, OHIO.

HAND-CULTIVATOR.

No. 841,461.　　　　Specification of Letters Patent.　　　　Patented Jan. 15, 1907.

Application filed January 9, 1905. Serial No. 240,217.

*To all whom it may concern:*

Be it known that I, BENJAMIN F. SHUART, a citizen of the United States, residing at Oberlin, in the county of Lorain and State of Ohio, have invented certain new and useful Improvements in Hand-Cultivators; and I do declare that the following is a full, clear, and exact description of the invention, which will enable others skilled in the art to which it appertains to make and use the same.

My invention consists in a hand-cultivator provided with a suitable supporting-frame and front and rear wheels on opposite sides of said frame and a tooth-carrying frame suspended front and rear from said main frame on suitable hangers and adapted to be raised and lowered and to have a counterbalanced up-and-down play in the soil subject to conditions, all substantially as shown and described and particularly pointed out in the claims.

In the accompanying drawings, Figure 1 is a side elevation of my new and improved hand-cultivator, and Fig. 2 is a plan view thereof. Fig. 3 is a plan view of the cultivator enlarged as compared with Fig. 2 and with the wheels removed and portions here and there in section, as clearly shown. Fig. 4 is a rear elevation of the cultivator, and Fig. 5 is a side elevation of one of the cultivator-teeth and its immediate means of support. Fig. 6 is a cross-section on line $x\ x$, Fig. 5.

In the several views, A represents the main frame of the cultivator, and B and C, respectively, the front and rear carrying-wheels, there being one wheel at each end and on opposite sides and each wheel supported on a spindle or shaft $b$ and $c$, respectively, which form the cross connections between the side bars of the main frame at the ends thereof and are rigidly fixed in said frame through intervening sleeves $b'$ and $c'$ at each end. Other sleeves and cross-bolts here and there are employed to make further rigid connections between the sides of the main frame and which may also serve for other purposes if found convenient.

By setting the wheels at the ends of the main frame and outside thereof on opposite sides, as shown, they balance the main frame between them and being in staggered relation and spaced apart they travel in their own paths parallel to the row under cultivation and from each side thereof a suitable distance. A handle F is shown having the bars $f$ thereof converging downward and supported at their lower ends on the forward part of the main frame and are further supported on standards 4 at the rear on which they are adapted to be raised and lowered to accommodate or convenience the person who may be using the implement.

D represents the cultivator tooth-frame as a whole, but which consists in something of a lazy-tongs construction, having tooth-bars $d$ parallel to each other and to the main frame lengthwise, parallel-inclined bars $d'$ by which the tooth-bars are connected at their respective ends, and adjusting-bars $d^2$, adapted to spread or narrow the said tooth-frame according to the width of the space the implement is to cover when straddling a row or between rows. The inner ends of the inclined bars $d'$ are pivoted upon longitudinal bar 5 central upon frame D, as are also the inner ends of the bars $d^2$, in slot $d^3$, and suspensory links or hangers 6 front and rear at each side of frame D are pivotally engaged with the respective ends of the bar 5 and at their upper ends are pivoted to or on main frame A. The said links are of sufficient length to hang at a front to rear inclination while at work, so that while they become draft-links, as it were, for the tooth-frame, they have such relations thereto and to the main frame that the tooth-frame has a comparatively free up and down play while at work, very much as if it were disassociated from the main frame and there were simply ordinary draft connections with its front. Said links are, however, used to hold the tooth-frame in an even horizontal position, so as to make the action of its teeth uniformly effective, and it has perfectly free play within the limits described except as it is limited by the weighting or counterweighting devices shown and by which the said tooth-frame is brought under the complete control of the operator as respects its depth of work and whether it is to be weighted down or up for deeper or shallower work. Sometimes it occurs that the soil is of such character that the teeth should have greater penetration than at others or the soil may be heavy and the conditions unfavorable for deep work, or it may be desired to do surface weeding or simply stir the top soil, and all such and other conditions and needs are anticipated and provided for by the means shown. These comprise a central lever E, pivoted upon the main frame at 8, and having its front end bent or extending upward at an inclination relatively as shown, so as to utilize said lever on both sides of its pivot. The rear end of the lever projects back beyond the posts 4, so as to be within convenient reach and control of the operator, and a link 9 connects lever E with the tooth-frame D. A counterweight 10 is adapted to be fixed on either side of pivot 8, according as the depression or weighting down of the tooth-frame is desired, or the counterbalancing thereof for lighter or shallower work, in which case weight 10 is moved to the other end of the lever, say in position shown by dotted lines, and the said weight is adjustable to any desired position on said lever. This places the burden of either deep or shallow work wholly on the implement and takes it off the operator, who now has nothing to do but to push and guide the implement. In either case, however, the tooth-frame still continues to have freedom of movement or play up and down upon its draft-links 6 and is not arbitrarily fixed, as would occur if definite adjustments thereof in respect to the main frame were employed.

Tooth-bars $d$ have ribs $d^4$ lengthwise on their bottom and the upper attached ends of the teeth G have trough-shaped formation adapted to fit upon and over said ribs, and a single securing-bolt $g$ serves to otherwise fixedly engage the tooth on its bar. Presumably the teeth G are struck or formed up into the desired shape from sheet-steel or other suitable metal, and the entire implement is designed with respect to its hand use and power and therefore is as light in all its parts as its use will allow, having regard also for the wear and tear of long usage.

Obviously changes in cultivator-teeth to one or another kind can be made according to the work to be done, and devices may be placed on frame D to throw or scrape earth away from a row of plants or to throw earth to the same, or frame D may be removed, and a drag of some other form or a wholly different appliance may be used in its stead, if found desirable, such as a scorer or marker, to lay out ground in rows or squares for planting. The frame D is therefore separably bolted to or upon central upper suspended carrying bar or plate 5, engaged by the links 6, and whatever frames, drags, teeth, marking devices, or other things are to be used are attached to the carrying member 5.

One of the objects in having wheels on a cultivator is to render it possible to regulate the depth of the penetration of the teeth. On all other cultivators that I have ever seen the teeth after having been set to required depth were locked in that position, so that when small depressions were encountered they were not free to drop into them and when one of the wheels ran into a clod the teeth would be lifted out.

My cultivator, like all wheel-cultivators, has an adjustable and positive penetration. This is secured by depressing the lever E, Fig. 1, until the teeth are set at the required depth and then placing a pin over the lever in the appropriate holes in the posts 4 to keep them rising above this depth of cut; but they will have free play downward, so that when crossing depressions or when the wheels run over lumps they continue to do their work. The object of the lever E and weight is to give the required penetration when for the moment the lever has dropped away from the pin referred to in consequence of depressions, &c., the counterweight will be employed on very light soils.

What I claim is—

1. In hand-cultivators, a rigid main frame of greater length than width and a single supporting-wheel at each end of said frame and on opposite sides thereof, and handles to balance said frame on the wheels, in combination with an independent carrying-frame for cultivating devices beneath said main frame, front and rear inclined trailing links of equal length connecting said carrying-frame with said main frame, said carrying-frame being free to play up and down on its links in respect to the main frame, and separate adjustable supports for the cultivating devices removably secured to said carrying-frame.

2. The main frame and a single supporting-wheel at each end thereof and upon opposite sides, in combination with a carrying-frame for cultivator devices located between said wheels beneath the main frame, rearwardly-inclined draft-links suspending the carrying-frame front and rear from the main frame, a counterweight-lever pivoted between its ends on the main frame and a link connecting the same centrally to said carrying-frame, and a weight on said lever adapted to be shifted to either side of the pivot therefor, whereby the penetration of the cultivating devices is controlled.

In testimony whereof I sign this specification in the presence of two witnesses.

BENJAMIN F. SHUART.

Witnesses:
H. T. FISHER,
C. A. SELL.